(12) United States Patent
Burgers

(10) Patent No.: US 6,834,887 B2
(45) Date of Patent: Dec. 28, 2004

(54) BODY STRUCTURE FOR A MOTOR VEHICLE HAVING ASSEMBLED MEMBERS

(75) Inventor: Christiaan Burgers, Heimsheim (DE)

(73) Assignee: Dr. Ing. h.c.F. Porsche AG, Weissach (DE)

(*) Notice: Subject to any disclaimer, the term of this patent is extended or adjusted under 35 U.S.C. 154(b) by 0 days.

(21) Appl. No.: 10/156,663

(22) Filed: May 29, 2002

(65) Prior Publication Data
US 2002/0195811 A1 Dec. 26, 2002

(30) Foreign Application Priority Data
May 30, 2001 (DE) .......................... 101 26 234

(51) Int. Cl.⁷ .............................................. B62D 21/00
(52) U.S. Cl. ...................... 280/800; 280/781; 280/798; 180/311
(58) Field of Search ............................... 280/800, 781, 280/798; 180/311

(56) References Cited

U.S. PATENT DOCUMENTS 2,136,122 A   11/1938   Almdale ..................... 280/106
4,674,770 A   6/1987    Inagaki ....................... 280/797
6,349,953 B1 * 2/2002   Yoshihira et al. ..... 280/124.109

FOREIGN PATENT DOCUMENTS

| DE | 41 15 764 A1 | 5/1991 |
| DE | 43 35 586 A1 | 10/1993 |
| DE | 44 14 472 A1 | 4/1994 |
| DE | 195 04 127 A1 | 2/1995 |
| DE | 195 31 957 A1 | 8/1995 |
| DE | 197 20 109 A1 | 5/1997 |
| DE | 198 12 679 A1 | 3/1998 |
| DE | 198 12 879 A1 | 3/1998 |
| EP | 0 921 055 A2 | 8/1999 |
| GB | 2 326 853 | 1/1999 |

* cited by examiner

Primary Examiner—J. Woodrow Eldred
(74) Attorney, Agent, or Firm—Crowell & Moring LLP

(57) ABSTRACT

In a body structure for a motor vehicle made of assembled members spaced partition plates are arranged in the member. A working opening is formed between consecutive partition plates, and after the connection of adjacent members, the working opening can be closed by way of a cover plate, whereby a reinforced stability range is formed in the area of the member connection.

13 Claims, 1 Drawing Sheet

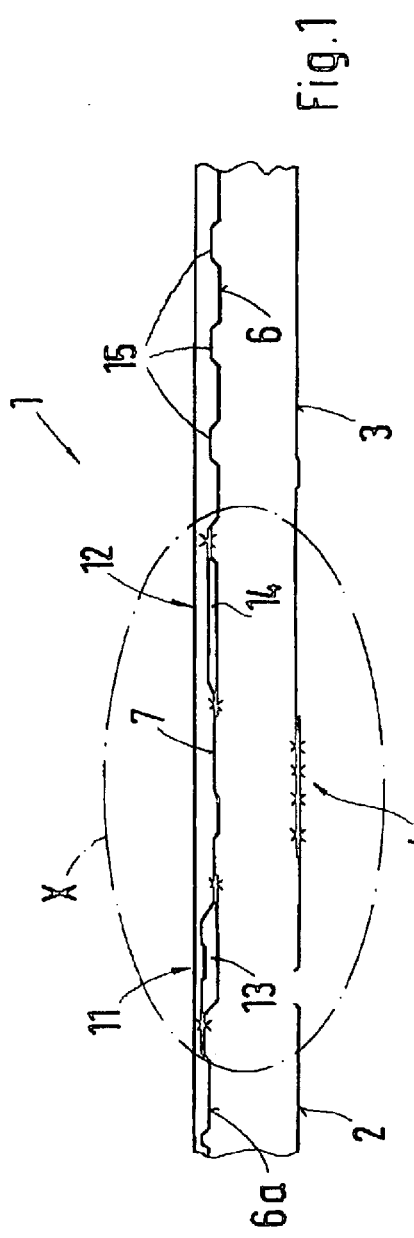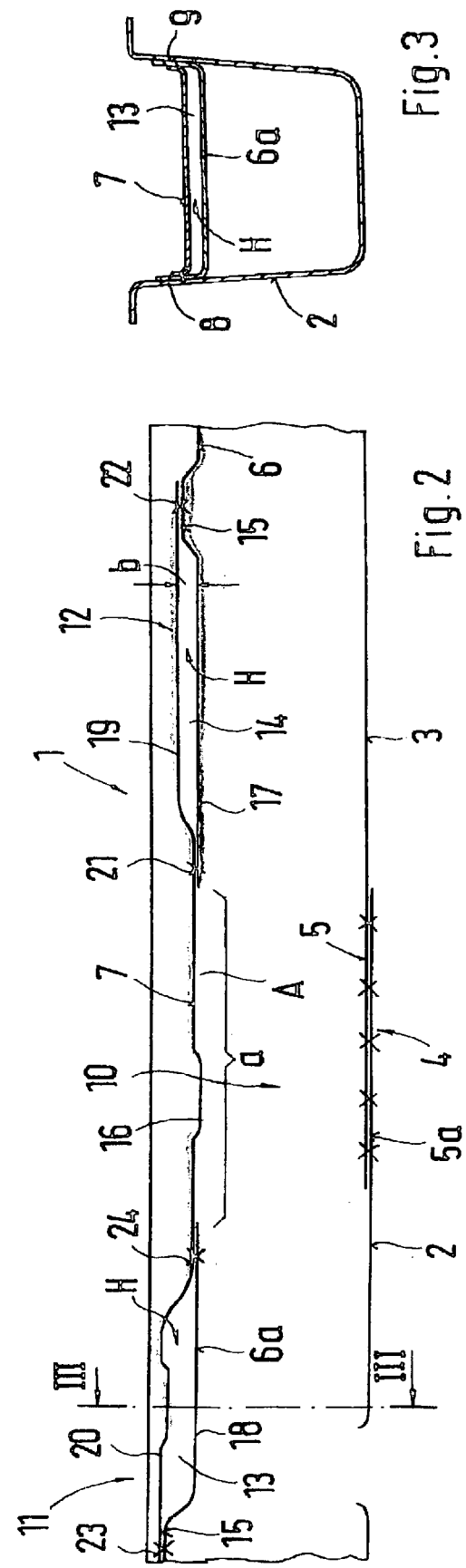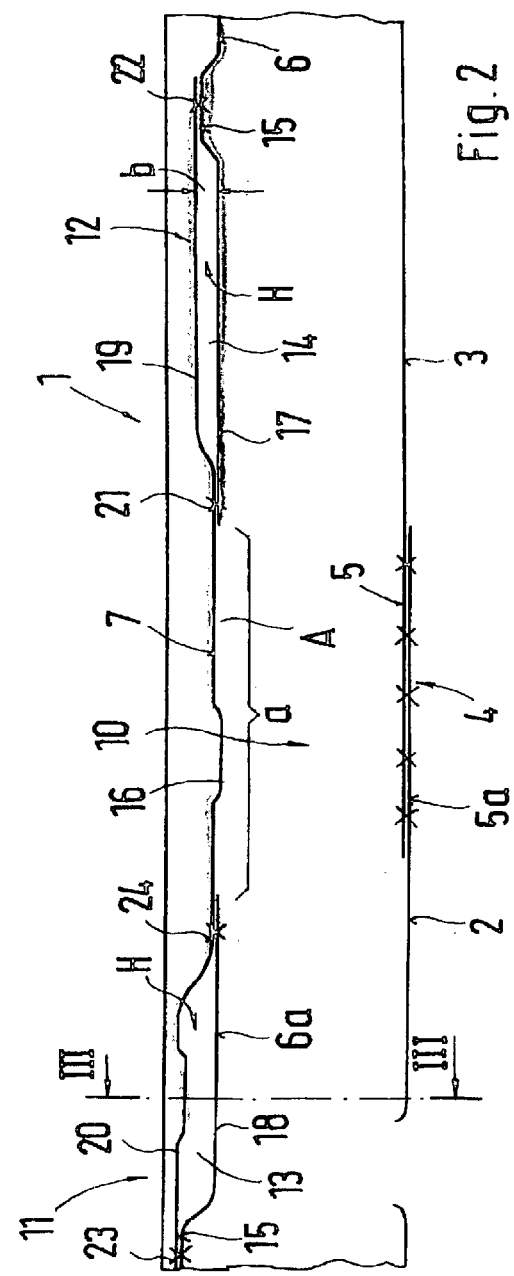

BODY STRUCTURE FOR A MOTOR VEHICLE HAVING ASSEMBLED MEMBERS

This application claims the priority of German patent document 101 26 234.5, filed May 30, 2001, the disclosure of which is expressly incorporated by reference herein.

BACKGROUND AND SUMMARY OF THE INVENTION

The invention relates to a body structure for a motor vehicle having assembled members which have reinforcements made of web elements mounted in the interior thereof.

U.S. Pat. No. 4,674,770 discloses a member whose cross-section consists of a U-profile and which has interior reinforcing profiles. On the one side, the latter are arranged with a profile floor and, on the other side, are arranged as a covering. Furthermore, U.S. Pat. No. 2,136,122 discloses members which are reinforced by means of a profile insert which consists of a profile part with a U-shaped cross-section.

It is an object of the invention to provide side members in a body structure which are easily accessible for welding in a connection area.

Another object of the invention is to provide a reinforcement of the connection area in the member.

These and other objects and advantages are achieved by the structure according to the invention, in which a connection area of adjacent members (at which they are joined together) is easily accessible, for example for spot welding, and the connected members can be subsequently reinforced after welding in this area. Such reinforcement is achieved in that the assembled members have a cover plate in the connection area, which cover plate can be connected with partition plates arranged underneath, so that transversely extending hollow structures are formed between the end connection areas of the cover plate with the partition plates.

So that the connection area of the assembled adjacent members is easily accessible before the connection (e.g., spot welding), adjacent partition plates are arranged at a distance from one another in the member and are fastened, so that a working opening to the connection area of the members is formed adjacent the connection area of the members.

The reinforcing effect of the partition plates is aided by transversely extending indentations which extend along their entire length. These indentations are adjoined by legs which are covered by legs of the cover plate; and the legs of the cover plate and of the partition plates, arranged above one another, jointly form the hollow member.

So that advantageously the partition plates, which are mutually connected by way of a cover plate, can add to the stabilizing effect of the indentations, the hollow structures are formed of two offsets at the end-side legs of the cover plate and of the partition plates. The offsets are arranged at a distance from one another, and the legs of the cover plate and of the partition plates can be connected with the opposite partition plates and the cover plate respectively.

The members are preferably provided with inserted partition plates; that is, these plates are already inserted into the members when these are delivered, i.e., connected with the latter by means of spot welding.

Other objects, advantages and novel features of the present invention will become apparent from the following detailed description of the invention when considered in conjunction with the accompanying drawings.

BRIEF DESCRIPTION OF THE DRAWINGS

FIG. 1 is a view of two mutually connected side members of a body structure, with reinforcing partition plates and a cover plate;

FIG. 2 is an enlarged view of a broken away portion of the structure according to FIG. 1; and FIG. 3 is a sectional view according to Line III—III of FIG. 2.

DETAILED DESCRIPTION OF THE DRAWINGS

A body structure of a vehicle comprises, among other things, a side member 1 which is composed of several individual members 2, 3, etc. The side members 2, 3 have a U-shaped cross-section which is open toward the top.

In the connection area 4, which is situated at the webs 5, 5a (FIG. 2) of the U-profiles of the two members 2 and 3, the individual members 2 and 3 are connected with one another, for example, by spot welding.

Because of the division of the side member 1 into the member parts 2 and 3, this connection area 4 has a reduced stability. As a r suit of the arrangement of partition plates 6, 6a inserted into the profile of the side members 2, 3 as well as of a cover plate 7 connected with the partition plates, the side member 1 is further reinforced.

Because the wall thicknesses are effectively doubled in the connection area 4, the members 2, 3 have a relatively high stiffness there, and so-called stiffness jump occurs next to this connection area 4, which stiffness jump causes a reduced stiffness. This stiffness jump is eliminated again by the cover plate 7 and partition plate 6a, 6, to which particularly the formed hollow members 13 and 14 contribute significantly.

The partition plates 6, 6a and the cover plate 7 in the side member 1 consist of profiles which have a U-shaped cross-section, and which can be fastened by means of their legs to the legs 8, 9 of the member 2, 3.

So that the connection area 4 between the side members 2, 3 will be easily accessible from above in the direction of the arrow 10 for spot welding, the adjacent partition plates 6, 6a are arranged at a distance a from one another so that a gap a is formed. After spot welding of the connection area 4, this distance a will be covered by the cover plate 7 which is situated above the partition plates 6, 6a and is connected with the latter.

Between the end connection areas 11, 12 of the partition plates 6, 6a with the cover plate 7, so-called transversely extending hollow structures 13, 14 are formed in the member 1. For this purpose, the partition plates 6, 6a are provided with several transversely extending indentations 15 arranged side-by-side. (The cover plate 7, above the connection area 4, also has at least one transversely extending corrugation or indentation 16.) The indentations 15 of the partition plates are adjoined by mutually facing legs 17, 18 of the partition plates 6, 6a on which legs 19, 20 of the cover plate 7 are arranged at a distance b. Between these legs 17, 18 and 19, 20, hollow spaces H are formed which, together with the legs, form the hollow structures 13, 14. The legs 17, 19 and 18, 20, which are arranged on one another, are each connected with one another with their free ends at least in points 21, 22 and 23, 24.

The partition plates 6, 6a extend in the longitudinal direction of the members 2, 3. Above each connection area 4 between the members 2, 3, the partition plates 6, 6a form a so-called working opening A with a linear dimension a. The working opening A is closed by the cover plate 7. The partition plates 6, 6a extend at least along the entire length of the side members 2, 3 of the vehicle body.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A body structure for a motor vehicle comprising axially in line assembled profiled members, each of which has a longitudinally extending interior reinforcing partition plate including web parts, wherein:

in a connection area between axially adjacent assemble members a cover plate is provided, and is connected with the partition plates, which are arranged underneath said cover plate;

a plurality of discrete hollow structures are formed between the cover plate and the partition plates; and said hollow structures extend transversely to said axially in line assembled members.

2. The body structure according to claim 1, wherein:

an axially extending gap exists between free ends of axially neighboring partition plates, adjacent the connection area of the assembled members; and said gap is covered by said cover plate.

3. The body structure according to claim 1, wherein:

the partition plates have transversely extending indentations which are adjoined by legs;

the indentations of the partition plates are covered by legs of the cover plate; and the legs of the cover plate and the partition plates arranged above one another together form the plurality of discrete transversely extending hollow structures.

4. The body structure according claim 1, wherein the hollow structures are formed of two mutually spaced opposite offsets at end-side legs of the cover plate and of the partition plates; and the legs are each connected at a free end with the opposite partition plates or the cover plate.

5. The body structure according to claim 1, wherein the cover plate has at least one transversely extending corrugation adjacent the connection area of two members.

6. The body structure according to claim 1, wherein:

on both sides of the connection area of the two members, a stiffness jump occurs which is eliminated by the hollow structures formed by the cover plate and the partition plate.

7. A structural component or a motor vehicle body, comprising:

a plurality of profiled members which are assembled longitudinally, with longitudinal extremities of adjacent profiled members being joined at connection areas;

a plurality of reinforcing partition plates which extend longitudinally within said assembled profiled members, and which have sides that are connected to interior surfaces of the profiled members; and a plurality of cover plates, which extend longitudinally within said assembled profiled members, having sides which are connected to interior surfaces of the profiled members, and are disposed on top of said partition plates;

wherein said partition plates and said cover plates have oppositely disposed transversely extending channels that cooperate to form a plurality of discrete transversely extending hollow reinforcing structures.

8. The structural component according to claim 7, wherein:

longitudinal extremities of consecutive partition plates inside said assembled profiled members are separated by working openings adjacent said connection areas;

whereby, access is afforded to said connection areas for joining said assembled profiled members prior to attachment of said cover plate.

9. A body structure for a motor vehicle comprising a plurality of axially in line assembled members, each having U-shaped transverse profile formed by sides that are connected by a web, and reinforcements in the form of partition plates that are fastened to interior surfaces of said sides; wherein:

the assembled members have a web connection area comprising longitudinally overlapping portions of said webs;

a working opening is formed by a gap between neighboring ends of said partition plates, opposite said web connection area;

in an assembled state of said body structure, said working opening is covered by a covering plate fastened to said body structure and to said partition plates;

in said assembled state of said body structure, said partition plates and said covering plate cooperate to form a plurality of discrete hollow enclosures which extend transversely to said assembled body structure, between said sides of said U-shaped profile.

10. The body structure according to claim 9, wherein:

the partition plates have transversely extending indentations that are adjoined by legs;

the legs of the partition plates are covered by legs of the covering plate; and the legs of the covering plate and of the partition plates, which are arranged above one another, jointly form the hollow enclosures.

11. The body structure according to claim 9, wherein:

the hollow enclosures are formed by mutually spaced, oppositely projecting steps at the ends of legs of the covering plate and of the partition plates; and the legs are connected at free ends thereof with opposite partition plates or the cover plate.

12. The body structure according to claim 9, wherein the covering plate has at least one transversely extending bead in the web connection area.

13. The body structure according to claim 9, wherein a jump in rigidity exists at both sides of the web connection area of the assembled members, which jump is eliminated by the hollow members formed by the covering plate and the partition plate.

* * * * *